United States Patent [19]
Mong et al.

[11] Patent Number: 6,026,177
[45] Date of Patent: Feb. 15, 2000

[54] METHOD FOR IDENTIFYING A SEQUENCE OF ALPHANUMERIC CHARACTERS

[75] Inventors: John Lee Chung Mong; Wong Wing Kin, both of Kowloon, The Hong Kong Special Administrative Region of the People's Republic of China

[73] Assignee: The Hong Kong University of Science & Technology, Kowloon, The Hong Kong Special Administrative Region of the People's Republic of China

[21] Appl. No.: 08/520,574

[22] Filed: Aug. 29, 1995

[51] Int. Cl.$^7$ .................................................... G06K 9/62
[52] U.S. Cl. ........................................................ 382/156
[58] Field of Search ................................ 382/156, 157, 382/158, 159, 190, 187

[56] References Cited

U.S. PATENT DOCUMENTS

| | | | |
|---|---|---|---|
| 5,048,097 | 9/1991 | Gaborski | 382/156 |
| 5,060,278 | 10/1991 | Fukumizu | 382/157 |
| 5,105,468 | 4/1992 | Guyon et al. | 382/155 |
| 5,239,593 | 8/1993 | Wittner et al. | 382/190 |
| 5,479,570 | 12/1995 | Imagawa et al. | 382/159 |
| 5,511,134 | 4/1996 | Kuratomi et al. | 382/158 |
| 5,712,959 | 1/1998 | Streit | 395/24 |
| 5,724,487 | 3/1998 | Streit | 395/24 |
| 5,835,633 | 11/1998 | Fujisaki et al. | 382/187 |

*Primary Examiner*—Andrew W. Johns
*Attorney, Agent, or Firm*—Burns, Doane, Swecker & Mathis, L.L.P.

[57] ABSTRACT

A character recognition system is described, in particular a system suitable for use in monitoring cargo container codes or vehicle number plates. An image of the code is first analyzed to extract potential characters. As part of this process, long horizontal and vertical line segments are filtered out. The extracted potential characters are then input to a two-level character recognition means. The first level comprises a neural network classifier that classifies a character into a smaller set of possible characters; and then the second level comprises another neural network classifier which identifies which character among the smaller set of possible characters the extracted character is.

10 Claims, 12 Drawing Sheets

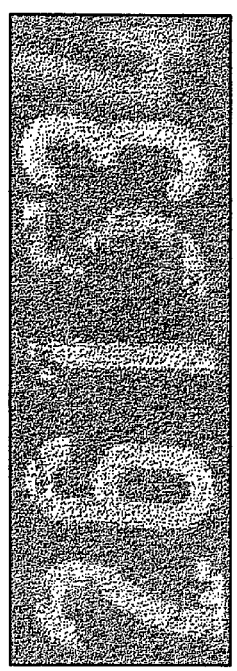
FIG. 6(a)
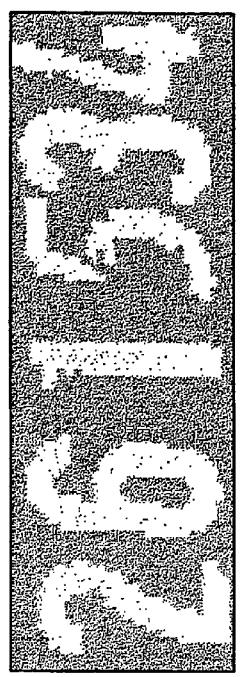
FIG. 6(b)
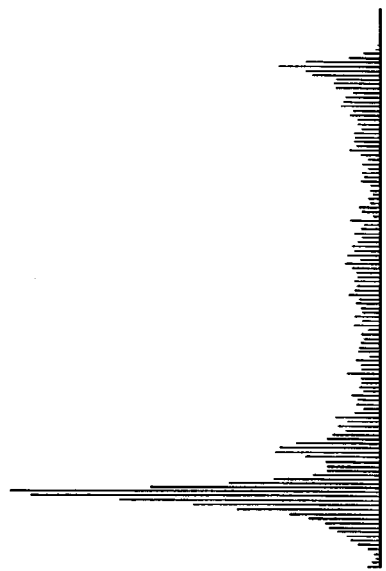
FIG. 6(c)
FIG. 6(d)

| Group | Member | Group | Member | Group | Member |
|---|---|---|---|---|---|
| 0 | 0 9 D U | C | 0 C G | O | 0 O Q |
| 1 | 1 3 I T | D | 3 7 9 D M | P | P R |
| 2 | 2 7 P | E | E | Q | Q O |
| 3 | 3 J | F | F R | R | 8 R |
| 4 | 4 C H | G | G | S | 3 5 6 S |
| 5 | 5 6 S | H | H N | T | I T |
| 6 | 6 E G S | I | 1 8 I L U | U | 0 8 M U |
| 7 | 1 7 | J | 1 J | V | V U |
| 8 | 3 8 9 B R | K | K X | W | I W |
| 9 | 9 | L | L X | X | X |
| A | A | M | M U | Y | M Y |
| B | 6 B R | N | K N | Z | 7 Z |

FIG. 14

ORIGINAL HISTOGRAM

BACKGROUND REMOVED

FOREGROUND SCALED

METHOD FOR IDENTIFYING A SEQUENCE OF ALPHANUMERIC CHARACTERS

FIELD OF THE INVENTION

This invention relates to a method and apparatus for character recognition, and in particular to such a method and apparatus for identifying and recognizing characters such as letters and numerals.

BACKGROUND OF THE INVENTION

In a number of different technical fields a need has arisen for systems that are capable of automatically "reading" strings of alphanumeric characters. One example is a system for recognising and recording car number plates as part of a vehicle monitoring and control system. Another application, and one of increasing commercial importance, is in container code verification in a container port.

Cargo containers are each provided with a unique identification code which must be checked and verified every time a container is moved into or out of a container port. The codes are applied to the containers normally by stencil or by some other means on the side of the container. Conventionally such codes are read by an operator and entered manually into the computer system controlling operations in the cargo terminal. This is clearly inefficient and an automated system for reading the codes and entering the data directly into the control system would be desirable.

Automating this process has numerous problems, however. To begin with, there is no fixed size for the characters and no standard typeface. The precise location of the code may vary from container to container. The container may be dirty, there may be good or poor contrast between the characters and the background. The system must be capable of identifying characters in natural light and artificial light, good weather and bad. To be effective to replace current manual systems any automated system must have a very high degree of accuracy and reliability in all these conditions.

PRIOR ART

Early examples of character recognition systems include GB1425024 in which an output from a television camera is fed to a comparator for reading codes applied to boxes. Bar codes are also well known and an early example of such a system is to be found in GB1000542. A review article outlining character recognition system development is to be found as Mori et al: *Proceedings of the IEEE*, Vol.80 No.7 July 1992 pp1029–1058.

As is mentioned by Mori et al, recently, with the advances made in artificial intelligence, the use of neural networks has been proposed for use in character recognition systems. Examples of the use of neural networks in such systems are to be found in Yamada: *NEC Res. & Dev.* No.98 July 1990 pp81–88 which describes an algorithm for recognizing handwritten numerals, and Garris et al: *Proceedings of Southcon* 1992 pp154–159.

More recently, GB2273191A discloses a character recognition system for container code verification using a neural network. The system of GB2273191A uses a series of principal steps: character extraction, character normalization, character recognition, and code verification. A neural network is used in the character recognition step to recognize the patterns defined by the standard size characters produced by the character extraction and normalization steps. A multi-layer feed-forward window-based neural network model is used. The neural network consists of an input layer, one or more hidden intermediate layers and an output layer. Defined areas or windows of a normalized grey level character pixel map are used as the input for the neural network.

To date, none of the prior proposals have provided a sufficiently high degree of accuracy and reliability for them to form successful commercial systems. There remains a need for a highly accurate and reliable character recognition system.

SUMMARY OF THE INVENTION

According to the present invention there is provided a method of identifying a sequence of alphanumeric characters, comprising the steps of:

(a) producing an image of said character sequence, (b) extracting potential characters from said image including filtering said image with a long horizontal and vertical line segments removal filter, (c) normalizing said extracted potential characters, and (d) inputting said normalized potential characters to a character recognition means, wherein said character recognition means comprises two network classifiers, a first said network classifier comprising a first hidden layer feed forward neural network which will classify the input pattern into a first set of categories, and the second classifier comprising a second hidden layer feed forward neural network which will recognize the pattern from the first set of pattern categories.

Thus the present invention provides a method for identifying a sequence of alphanumeric characters. Where this sequence comprises a code, for example a cargo container code, the thus identified code sequence may then be subject to further processing steps including code extraction and code verification steps.

The filtering step (b) may also include filtering the image with a short horizontal and short vertical line segments removal filter to remove any unwanted noise.

In the extraction step, after removal of unwanted segments with the filter, successive horizontal and vertical projection and segmentation techniques are used to segment the regions potentially containing the characters. Particularly, unlikely potential characters may possibly be removed at this stage. Then, the regions are binarized and the connected components are found by means of a 4-way-recursive component search.

In the character normalization step, the characters are preferably normalized to the size of 16×16 pixels with 256 grey levels from white to black. The background is set to grey level 0 and the foreground is scaled to the range 128 to 255.

In broad terms the present invention may be considered to be comprised of two halves. Firstly a method is provided for the extraction of potential characters from an image, and secondly a method is described for the improved recognition of such extracted characters. Both halves represent improvements over the prior art and may be employed independently of each other.

Accordingly therefore the present invention also extends to a method of isolating potential characters from a sequence of alphanumeric characters, comprising the steps of:

(a) producing an image of said character sequence using a video camera and a frame grabber, (b) filtering said image to remove long horizontal and vertical line segments, (c) applying successive horizontal and vertical segmentation techniques to segment the regions potentially containing characters, (d) binarizing said segmented regions, and (e) finding connected components by means of a four-way recursive component search.

In addition the present invention also extends to a method of recognizing an alphanumeric character, comprising: inputting a potential character pattern into a character recognition means, said character recognition means comprising two network classifiers, a first said network classifier comprising a first hidden layer feed forward neural network which will classify the input pattern into a first set of categories, and the second said network classifier comprising a second hidden level feed forward neural network which will recognize the pattern from the first set of pattern categories.

As discussed above the present invention has particular application to the problem of recognizing and verifying codes, for example cargo container codes used in cargo handling, and vehicle number plates.

Accordingly the invention also extends to a method of verifying a code, said code comprising a sequence of alphanumeric characters, comprising the steps of:

(a) producing an image of said character sequence, (b) extracting potential characters from said image, including filtering said image with a long horizontal and vertical line segments removal filter, (c) normalizing said extracted potential characters, (d) inputting said normalized potential characters to a character recognition means, wherein said character recognition means comprises two network classifiers, a first said network classifier comprising a first hidden level feed forward neural network which will classify the input pattern into a first set of categories, and the second classifier comprising a second hidden level feed forward neural network which will recognize the pattern from the first set of pattern categories, (e) extracting the code from said recognized characters, and (f) verifying said extracted code against a prestored target code.

BRIEF DESCRIPTION OF THE DRAWINGS

An embodiment of the invention will now be described by way of example and with reference to the accompanying drawings, in which:

FIGS. 6(a)–(d) show as an example, respectively, an original extracted image, a binarized image, a grey level histogram and a smoothed grey level histogram, FIG. 14 illustrates the possible character sets forming 36 first level groups.

DETAILED DESCRIPTION OF PREFERRED EMBODIMENT

Figure 1:
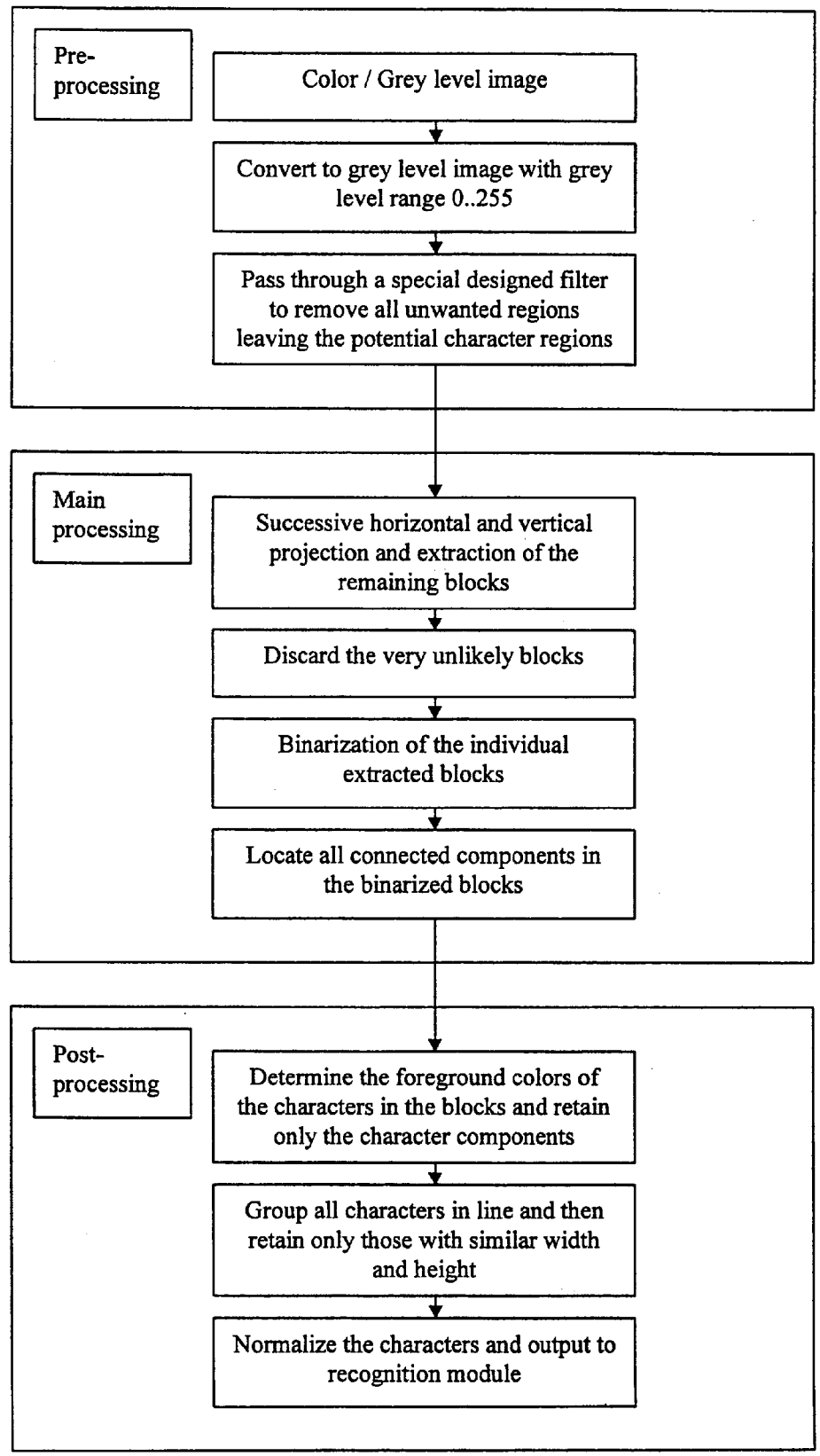
FIG. 1 is a block diagram showing schematically an overview of the character extraction and normalization steps.

The system of the present invention may be considered as comprising two halves, firstly a character extraction system for extracting characters from an image, which extracted characters are then input into a second character recognition system. FIG. 1 is an overview of the character extraction system which includes a pre-processing stage in which the image is (if necessary) converted to a grey level image and then filtered, and a main processing stage in which the image is subject to successive horizontal and vertical projection and extraction of remaining blocks, discard of particularly unlikely blocks, binarization, and location of connected blocks. Finally, the extracted characters are subject to post-processing including grouping and normalization. These stages will be described in more detail below.

Figure 2A:
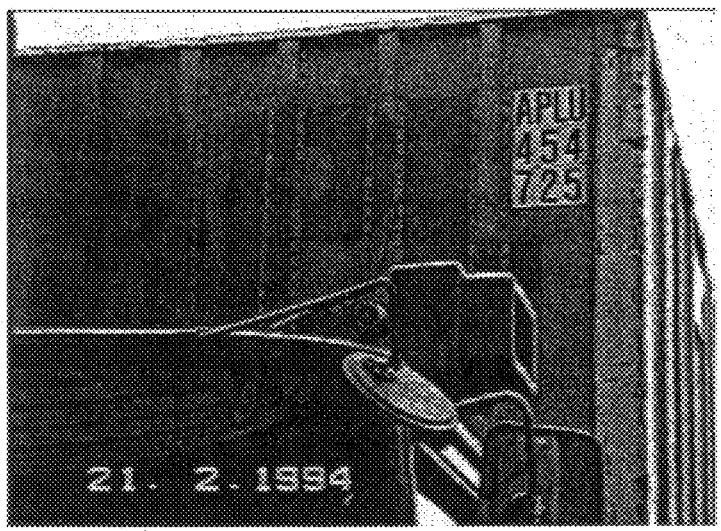
FIGS. 2(a)–(c) show real images bearing alphanumeric sequences.
Figure 2B:
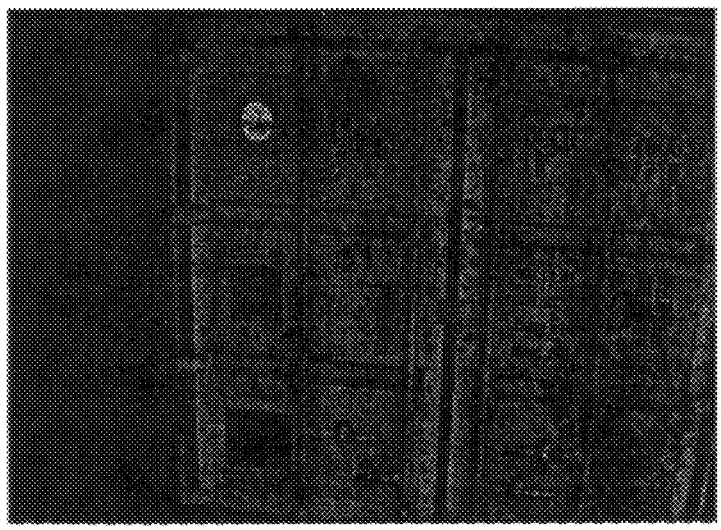
Figure 2C:
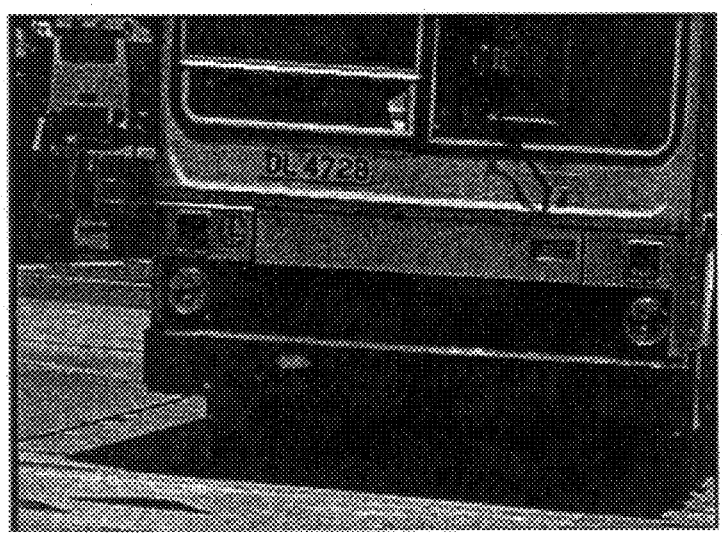
Figure 3A:
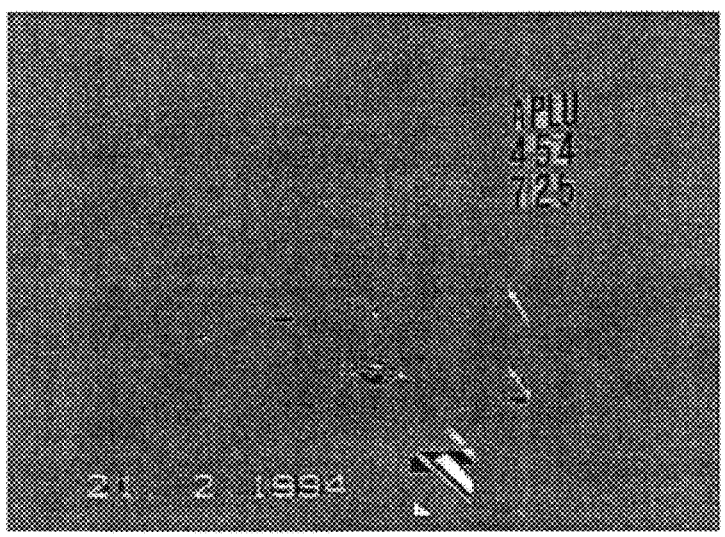
FIGS. 3(a)–(c) show the images of FIGS. 2(a)–(c) after filtering of long horizontal and vertical segments.
Figure 3B:
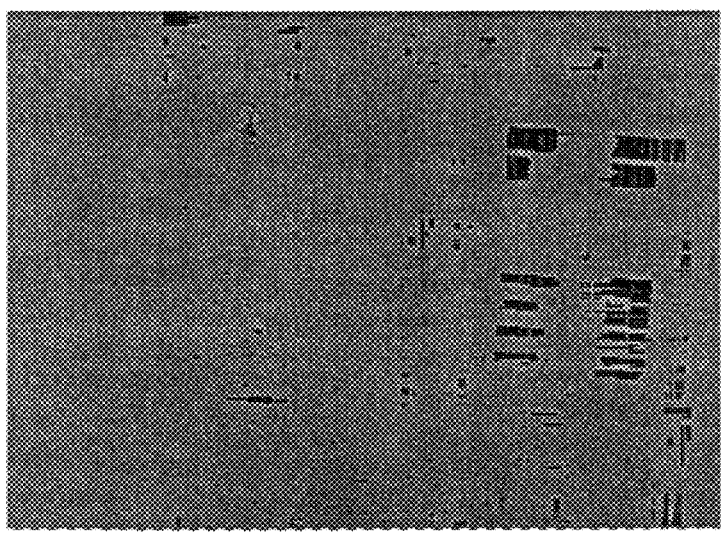
Figure 3C:
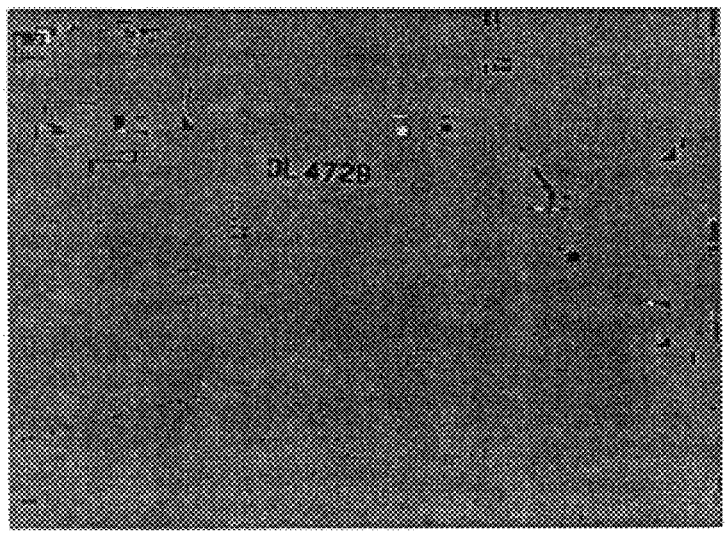

FIGS. 2(a)–(c) show original images bearing sequences of alphanumeric characters. The basic images may be obtained by using a video camera and a frame grabber. The frame grabber should ensure grabbed images having adequate resolution, which here is 768×512, and the video camera should have an auto-iris capability and should be hung at such a position that the entire back surface of the container enters its field of view. Natural light is sufficient during the day, and at night or during dark days fluorescent light may be used. FIGS. 2(a)&(b) show cargo container codes, while FIG. 2(c) shows a bus number plate. FIGS. 3(a)–(c) show the same images after an initial filtering is performed to remove all very long horizontal and vertical segments. The processed images show that all unwanted regions such as the road surface, sky, vehicle surface, container surface, thick horizontal or vertical bars are removed from the images and only the potential character regions remain. This long vertical and horizontal scan line removal technique (which is described below) can be viewed as a filter which removes all unwanted regions in the character extraction process.

Vertical and horizontal line segmentation will now be described. The main problem here is to locate the vertical and horizontal line segments. We first define the horizontal line segment and vertical line segment in an image. The grey level of a pixel in an image with width W and height H is defined as c(x,y) where x in $\{0 \ldots W-1\}$ and y in $\{0 \ldots H-1\}$. c(x,y) is within the range $\{0 \ldots 255\}$.

A horizontal line segment is defined as $\{(x1, y1),(x2,y1)\}$ s.t. for all x in $\{x1 \ldots x2\}$, $|c(x,y1)-c(x+k,y1)| \leq \text{threshold}_{hori}$ and $x2 \geq x1$. Where c(x,y) is the gray level of the pixel (x,y) in the image and k is the skip factor of line segmentation, the larger the value, the smaller the computation complexity and $\text{threshold}_{vert}$ is the value to be determined.

A vertical line segment is defined as {(x1,y1),(x1,y2)} s.t. for all y in {y1 ... y2}, |c(x1,y)−c(x1,y+k)|≦threshold$_{vert}$ and y2≧y1. Where c(x,y) is the gray level of the pixel (x,y) in the image and k is the skip factor of line segmentation, the larger the value, the smaller the computation complexity and threshold$_{vert}$ is the value to be determined.

A set of all horizontal line segments in the image is defined as {{(x1,y1),(x2,y1)}} s.t. for all x1,x2 in {0 ... W−1} and y1 in {0 ... H−1} and {(x1,y1),(x2,y1)} is a horizontal line segment defined by the above definition. For all x3≧x1 and x4≦x2, {(x3,y1),(x4,y1)} in the set ⇒x3=x1 and x4=x2.

A set of all vertical line segments in the image is defined as {{(x1,y1),(x1,y2)}} s.t. for all y1,y2 in {0 ... H−1} and x1 in {0 ... W−1} and {(x1,y1),(x1,y2)} is a vertical line segment defined by the above definition. For all y3≧y1 and y4≦y2, {(x1,y3),(x1,y4)} in the set ⇒y3=y1 and y4=y2.

The absolute difference of the adjacent pixel values is used to segment the line so that a line with continuously changing gray level will still be segmented. The difference between the minimum and the maximum gray level in the line segment may be very large but the gray levels of the line are continuously changing. The characters will not contain these kinds of lines because the characters are assumed to have relatively great contrast with the background.

The thresholds for vertical line segments and horizontal line segments are different. The thresholds are defined as follows:

$$threshold_{hori} = \frac{\sum_{y=0}^{H-1}\sum_{x=0}^{W-2} |c(x+1, y) - c(x, y)|}{H \times (W-1)} \times Constant_{hori} \quad (1)$$

$$threshold_{vert} = \frac{\sum_{x=0}^{W-1}\sum_{y=0}^{H-2} |c(x, y+1) - c(x, y)|}{W \times (H-1)} \times Constant_{vert} \quad (2)$$

threshold$_{hori}$ is the average absolute difference of the two adjacent horizontal pixels in the whole image scaled by Constant$_{hori}$ while threshold$_{vert}$ is the average absolute difference of the two adjacent vertical pixels in the whole image scaled by Constant$_{vert}$. Constant$_{hori}$ and Constant$_{vert}$ are chosen by testing many different kinds of images.

Experimental work has led to the following observations regarding characters in real scene images. Characters are composed of short horizontal and vertical line segments. The character sizes of container ID codes are in the pixel range from 16×16 to 24×48, and the width of the character strokes are greater than 3 pixels. The contrast between the gray levels of the characters and the background is greater than that of non-characters with the background. The characters are either black on white or white on black and the contrast between the characters and the background is high. The non-character regions include: long horizontal and long vertical line segments; long horizontal and short vertical line segments; short horizontal and long vertical line segments. The non-character regions will not include both short horizontal and short vertical line segments. From these observations the raw image can be filtered to extract potential characters.

We assume that the character size is in the range from 16×16 to 24×48. A long horizontal line is defined as {(x1,y1),(x2,y1)}s.t.|x1−x2|>24 where {(x1,y1),(x2,y1)} is a horizontal line segment as defined above. A long vertical line is defined as {(x1,y1),(x1,y2)}s.t. |y1−y2|>48 where {(x1,y1),(x1,y2)} is a vertical line segment as defined above.

All horizontal and vertical line segments that are long are removed from the image. Removal means to set the pixel values of these lines to a value outside the gray level range {0 ... 255}.

The long horizontal line segment removal filter is defined as for all {(x1,y1),(x2,y1)} in the set of all horizontal line segments,
for all x in {x1 ... x2}, $$c(x, y1) = \begin{cases} 256 & \text{if } \{(x1, y1), (x2, y1)\} \text{ is long by the above definition} \\ c(x, y1) & \text{otherwise} \end{cases}$$

The long vertical line segment removal filter is defined as
for all {(x1,y1),(x1,y2)} in the set of all vertical line segments,
for all y in {y1 ... y2}, $$c(x1, y) = \begin{cases} 256 & \text{if } \{(x1, y1), (x1, y2)\} \text{ is long by the above definition} \\ c(x1, y) & \text{otherwise} \end{cases}$$

After removal of the long line segments, the filtered image will still have many small noise points and lines which will affect the later segmentation of the remaining potential character blocks. Thus, they should be removed to have a more clear image. FIGS. 3(a)–(c) are all cleared.

We assume that the width of the strokes of the characters is greater than or equal to 3 pixels. To clear the image, the remaining horizontal and vertical line segments with length less than 3 will be removed. Line segment removal means to set the gray level of the line to an out-of-range value 256.

The definitions of the remaining line segments here are different from the previous definitions of line segments. A remaining horizontal line segment is defined as {(x1,y1),(x2,y1)} s.t. for all x in {x1 ... x2},c(x,y1)≠256. A remaining vertical line segment is defined as {(x1,y1),(x1,y2)} s.t. for all y in {y1 ... y2},c(x1,y)≠256.

The next step is to segment the potential character regions from the filtered image. Because the input image is still in its original size, it is very large and impractical to use some region growing methods to segment the potential character regions. Thus, projection and segmentation methods are used.

Horizontal projection of the region defined by the top left corner and bottom right corner {(x1,y1),(x2,y2)} is defined as
for all y in {y1 ... y2}

$$Projection_{hori}(y) = \sum_{x=x1}^{x2} \begin{cases} 0 & \text{if } c(x, y) = 256 \\ 1 & \text{otherwise} \end{cases}$$

Vertical projection of the region defined by the top left corner and bottom right corner {(x1,y1),(x2,y2)} is defined as
for all x in {x1 ... x2}

$$Projection_{vert}(x) = \sum_{y=y1}^{y2} \begin{cases} 0 & \text{if } c(x, y) = 256 \\ 1 & \text{otherwise} \end{cases}$$

Figure 4A:
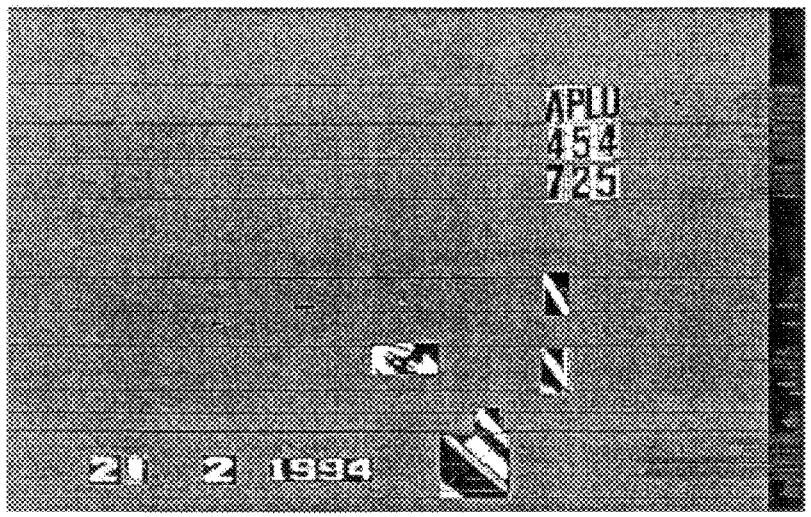
FIGS. 4(a)–(c) show the images of FIGS. 3(a)–(c) after the application of projection and segmentation techniques.
Figure 4B:
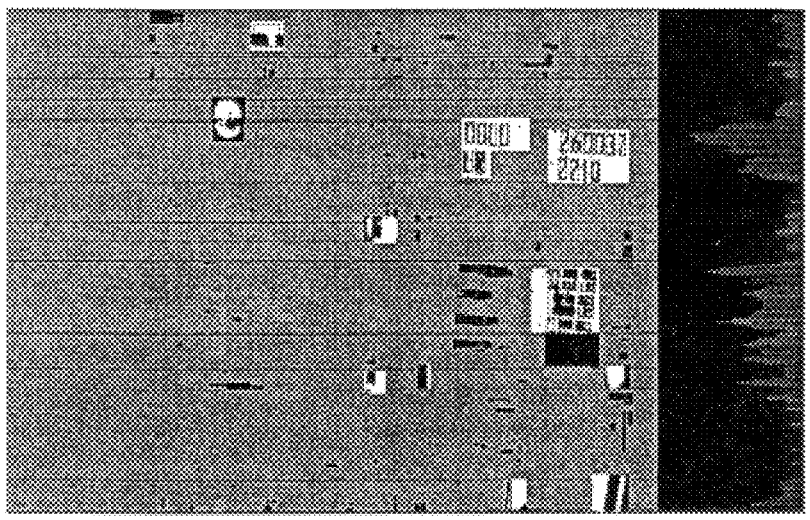
Figure 4C:
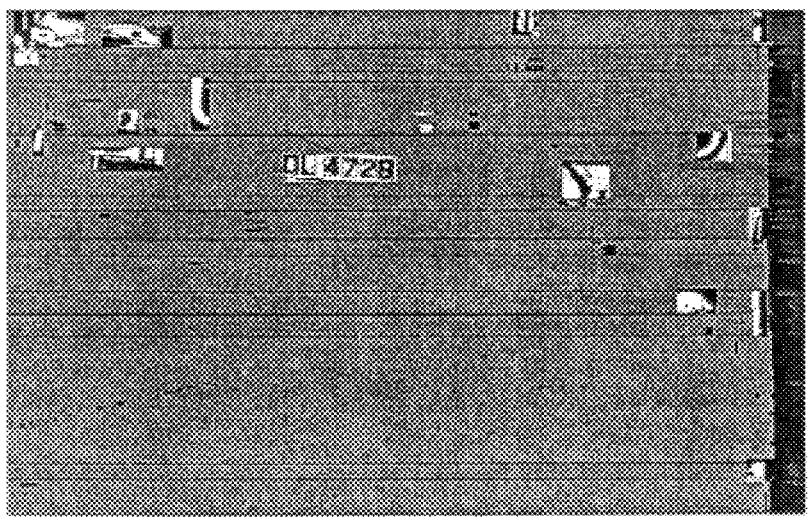

Since we assume that the characters are aligned horizontally, doing horizontal projection first can have higher projection amplitudes of the characters and it is thus easier to segment them. The results are shown in FIGS. 4(a)–(c) where the first horizontal projection and segmentation are shown and the final boundary box of the character regions are binarized and shown. After horizontal projection and segmentation of the local minimum in the projection histogram, successive vertical projections and segmentation and then horizontal projections and segmentation are done to the segmented regions. It has been observed that after the first horizontal projection and segmentation, two more successive vertical and horizontal projections are sufficient to segment the character regions even though the characters may be aligned slant or the characters may be surrounded by noise. For the sake of processing speed, there is no need to do recursive horizontal and vertical projections until non-dividable regions are found.

The segmented boundary boxes in the previous step are nearly the smallest rectangular boundary box of the characters. The experimental results can be seen in FIGS. 4(a)–(c) in which all regions with boundary boxes are binarized. As the boundary boxes are almost the smallest rectangular box around the characters that can be obtained, the thresholds determined from these regions are much better than those obtained from adaptive thresholding methods because these methods may not binarize the characters in a single smallest boundary region. Instead, the thresholds are interpolated between adjacent regions in adaptive thresholding techniques. The thresholds found from our algorithm will be good enough to extract the characters from rust, mud, peeling paint, fading color or uneven lighting regions.

Before doing binarization of the segmented blocks, highly unlikely segmented blocks are discarded so as to save computation time. Blocks with much content removed or blocks that are very small are automatically discarded and will not be put into subsequent processing.

The size of the character is assumed to be within the range 16×16 to 24×48. The criteria to distinguish the very unlikely blocks are as follows:

a. discard boxes with size<48×2 (very small), or
  b. discard boxes with more than ⅓ content removed and size>48×36 (very likely to be slanted bars).

Figure 5A:
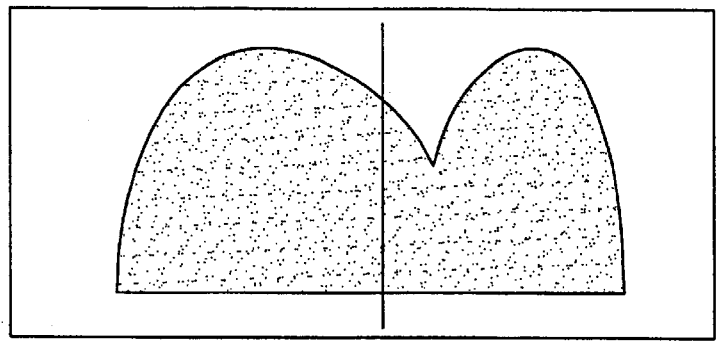
FIGS. 5(a)–(c) show grey level histograms and the process of binarization.
Figure 5B:
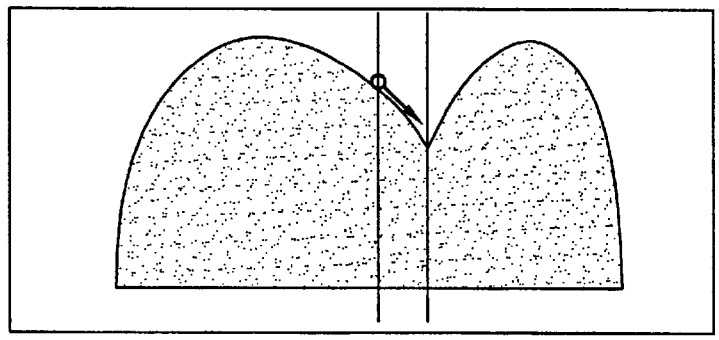
Figure 5C:
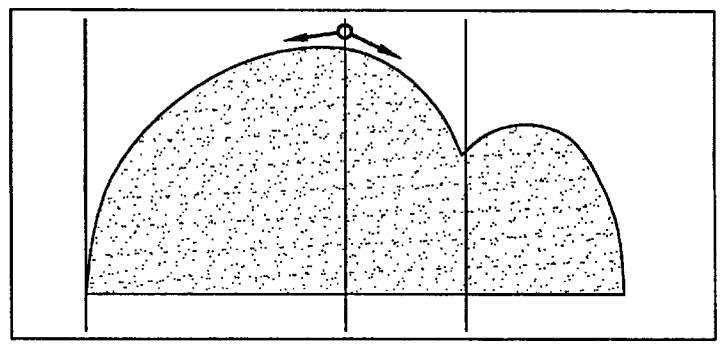

As the segmented blocks have a bimodal histogram, a good threshold for binarization can be found from the gray level histogram of the segmented blocks. Instead of just dividing the histogram into two halves and then choosing the median of the histogram as the threshold, the local minimum nearest to the median of the bimodal histogram is located and is set as the threshold to binarize the segmented blocks. This threshold is regarded as the valley of the bimodal histogram. The algorithms to determine the threshold are as follows:

a. Smooth the gray level histogram of the segmented regions. The smoothing technique is to quantumize the gray level from 256 levels to 64 levels. The smoothed gray level histogram of a region defined by the top left corner and bottom right corner $\{(x1,y1),(x2,y2)\}$ is formulated as follows:
  for all i in $\{0 \ldots 255\}$ $$Histogram_{graylevel}(i/4) = \sum_{x=x1}^{x2} \sum_{y=y1}^{y2} \begin{cases} 1 & \text{if } c(x,y) = i \\ 0 & \text{otherwise} \end{cases}$$

b. Divide the histogram into two halves (See FIG. 5a). The histogram is divided into two halves at x if and only if $$\left| \sum_{i=0}^{x} Histogram_{graylevel}(i) - \sum_{i=x+1}^{63} Histogram_{graylevel}(i) \right|$$

is minimum for some x.
  c. If the median is not on the peak of a hill, roll down from the slope of the hill to the valley of the bimodal histogram (See FIG. 5b). The algorithm can be formulated as follows:
  Suppose x is found by equation (3),
    if $Histogram_{graylevel}(x-1) > Histogram_{graylevel}(x)$ and
      $Histogram_{graylevel}(x) > Histogram_{graylevel}(x+1)$ then
      find minimum x' such that x'>x and
      $Histogram_{graylevel}(x') < Histogram_{graylevel}(x'+1)$
    if $Histogram_{graylevel}(x-1) < Histogram_{graylevel}(x)$ and
      $Histogram_{graylevel}(x) < Histogram_{graylevel}(x+1)$ then
      find maximum x' such that x'<x and
      $Histogram_{graylevel}(x') < Histogram_{graylevel}(x'-1)$
        where x'×4 is the determined threshold for binarization Some typical results are shown in FIGS. 6a to 6d.
  d. If the median is on the peak of a hill, roll down from the top of the hill to both sides and then choose the one that is closer to the median of the histogram (See FIG. 5c). Two thresholds will be found from this case. The total area from the left of the left threshold is compared against the total area from the right of the right threshold. The one with larger area will be chosen because the larger the area, the closer the valley to the median of the histogram. The algorithm can be formulated as follows:
  Suppose x is found by equation (3),
    if $Histogram_{graylevel}(x-1) < Histogram_{graylevel}(x)$ and
      $Histogram_{graylevel}(x) > Histogram_{graylevel}(x+1)$ then
      find maximum $x_{left}$ such that $x_{left} > x$ and
      $Histogram_{graylevel}(x_{left}) < Histogram_{graylevel}(x_{left}-1)$
      find minimum $x_{right}$ such that $x_{right} > x$ and
      $Histogram_{graylevel}(x_{right}) < Histogram_{graylevel}(x_{right}+1)$ $$\text{if } \sum_{i=0}^{x_{left}} Histogram_{graylevel}(i) > \sum_{i=x_{right}}^{63} Histogram_{graylevel}(i)\}$$

Figure 7A:
FIGS. 7(a)–(c) show (a) an original boundary box, (b) an enlarged boundary box and (c) illustrate false character detection.
Figure 7B:
Figure 7C:
Figure 8A:
FIGS. 8(a)–(c) show (a) an original boundary box, (b) a shrunk boundary box, and (c) illustrate false character detection.
Figure 8B:
Figure 8C:
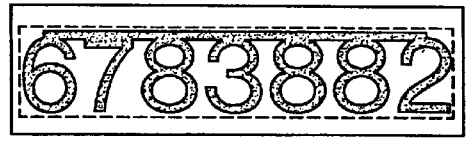

$x' = x_{left}$
  else
    $x' = x_{right}$
    where x'×4 is the determined threshold for binarization A four way recursive connected component searching algorithm is used to extract all the connected components in the binarized regions from the previous operations. During searching, the visited pixels will be marked and only the outermost boundaries of the connected components, ie top, left, bottom, right boundaries will be kept track of. If the region to be searched is too small, the boundary box can be expanded so that the background components can be extracted. FIG. 7(a) shows the original block, while FIG. 7(b) shows the expanded block. Without this expansion the background may be regarded as characters (see FIG. 7(c)). If the region to be searched is larger than a threshold size, the boundary box of the region may be shrunk so that characters merged with the background will still be extracted. FIG. 8(a) shows the characters in the boundary merged with the background, FIG. 8(b) shows the block reduced in size so that the characters no longer merge with the background or merge together through the background. Without such a reduction in size all merged characters may be regarded as one component (see FIG. 8(c)).

Two groups of potential characters are found from the previous step, one being the white characters and the other being the black, a false set being formed by the background. In determining the actual foreground color of the potential characters the following factors of both groups are considered:

(a) Calculate the standard deviations of heights+widths/2 of the components in the two groups. There are more variations in the width of the characters so the width term is divided by two in order to reduce its influence.

Figure 9:
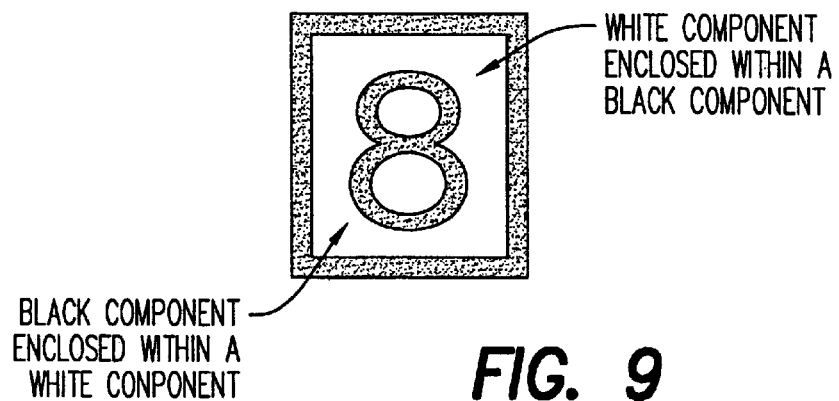
FIG. 9 shows a black component within a white component and vice versa.

(b) Determine if there exists characters in the groups that are white in color and are entirely enclosed within another character that is black (FIG. 9).

(c) Repeat (b) but with color reversed.

Figure 10A:
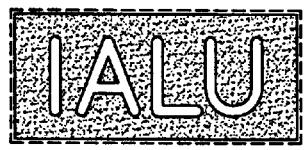
FIGS. 10(a)–(d) show, respectively, a black boundary, a deleted black boundary, a white boundary, and a deleted black boundary.
Figure 10B:
Figure 10C:
Figure 10D:

(d) Determine the boundary color of the original segmented rectangular regions.

black: The white characters are enclosed in a black box (FIG. 10(a))

deleted black: The white characters are in a large black region such that the surrounding black pixels are deleted in the previous long scan line removal step (FIG. 10(b))

white: The black characters are enclosed in a white box (FIG. 10(c)).

deleted white: The surrounding white pixels are deleted in the previous long scan line removal step (FIG. 10(d)).

The algorithm to determine the color of the characters is as follows:

if the size of the original rectangular box is smaller than 3×16×36 then, if boundary color is black
        character color is white
    if boundary color is deleted black
        if black in white exists in the black group then
            if white in black exists in white group then
                character color is white
            else
                character color is black
        else
            character color is white
    if boundary color is white
        character color is black
    if boundary color is deleted white
        if white in black exists in the white group then
            if black in white exists in the black group
                character color is black
            else
                character color is white
        else
            character color is black
else
    if there is one white component and boundary color is not black,
        character color is black
    if there is one black component and boundary color is not white,
        character color is white
    if s.d.(h+w/2) of black components<s.d.(h+w/2) of white components
        character color is black
    else
        character color is white Following the above steps extracts all potential characters. The next step is to find lines of characters. It is anticipated that the target characters in the image will be aligned horizontally and have similar width and height. Retaining only these kinds of characters in the image is helpful in eliminating many garbage characters. Finding a line of characters is very useful in subsequent character recognition.

Figure 11:
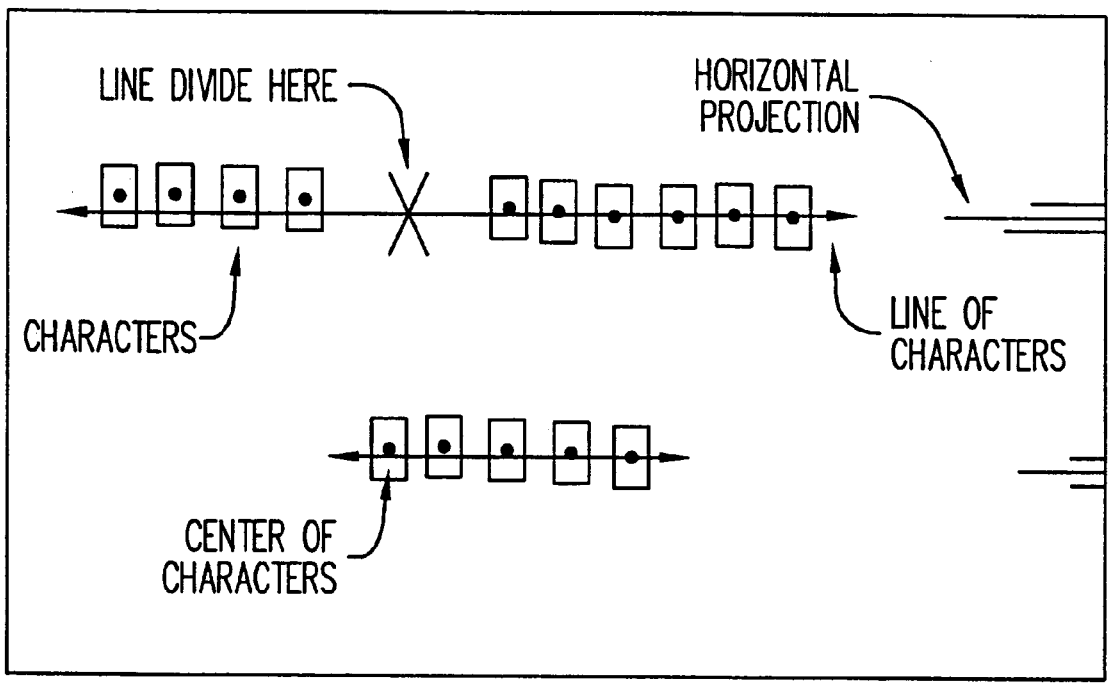
FIG. 11 illustrates a method for the extraction of lines of characters.

Horizontal projection of the center of the extracted blocks is used to extract lines of characters. FIG. 11 shows the idea of line grouping using horizontal projection of the center of the characters. The lines of characters in the above process can only extract long lines of characters and further division can be done to separate far apart characters on the same line (FIG. 11).

In each line there will be characters with differing widths and heights. Only characters with similar size are wanted. The histogram of the widths and heights is plotted and smoothed, the peak of the histogram is located and the corresponding width and height are set as threshold values to retain characters with similar width and height. Let the threshold values for width and height be w and h respectively. The characters with width in the range {w−0.8w . . . w+2w} and height {h−0.2h . . . h+0.4h} will be retained while all others are considered to be too large or too small. The range for the width is much larger than that for the height because there is much greater variation in the width of characters such as "I" and "W" than there is in their height.

Figure 15A:
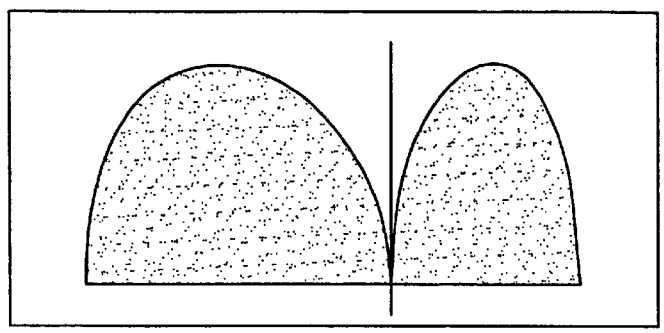
FIGS. 15(a)–(c) illustrate the character normalization process.
Figure 15B:
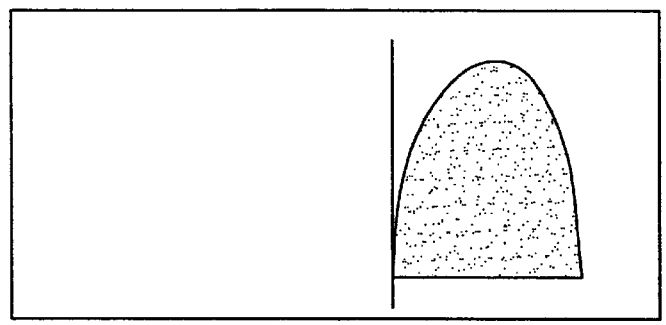
Figure 15C:
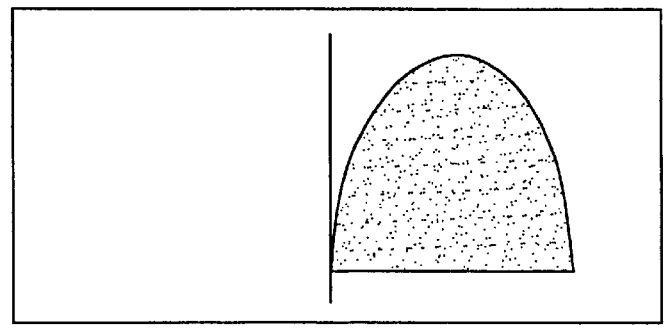

The extracted characters are normalized to the size of 16×16 pixels with 256 grey levels for ease of further recognition. The original ratio of the characters width and height will not be maintained and thus the character will use up all the space in the 16×16 box. The character will first be reverted if it is a black character on white background. The reversion functions to subtract the grey level of the pixel from the largest grey level 255 so that the normalized character will become white on black. The threshold found from the previous binarization step is used to distinguish between foreground and background. Binarization of the character to only two colors, black and white, may cause the input image to lose information. On the other hand it would be difficult for the recognition means to recognize an unprocessed grey image. As the character inside the extracted character image is the most important piece of information for recognition, the background is set to extreme grey value 0 so as to highlight the strokes of the character. The scaling of the foreground color is to normalize the grey level within the range 128 to 255. This will make some dark characters brighter, and some bright characters darker. The normalized characters are then output to the character recognition means. This is illustrated in FIGS. 15(a)–(c).

Figure 12:
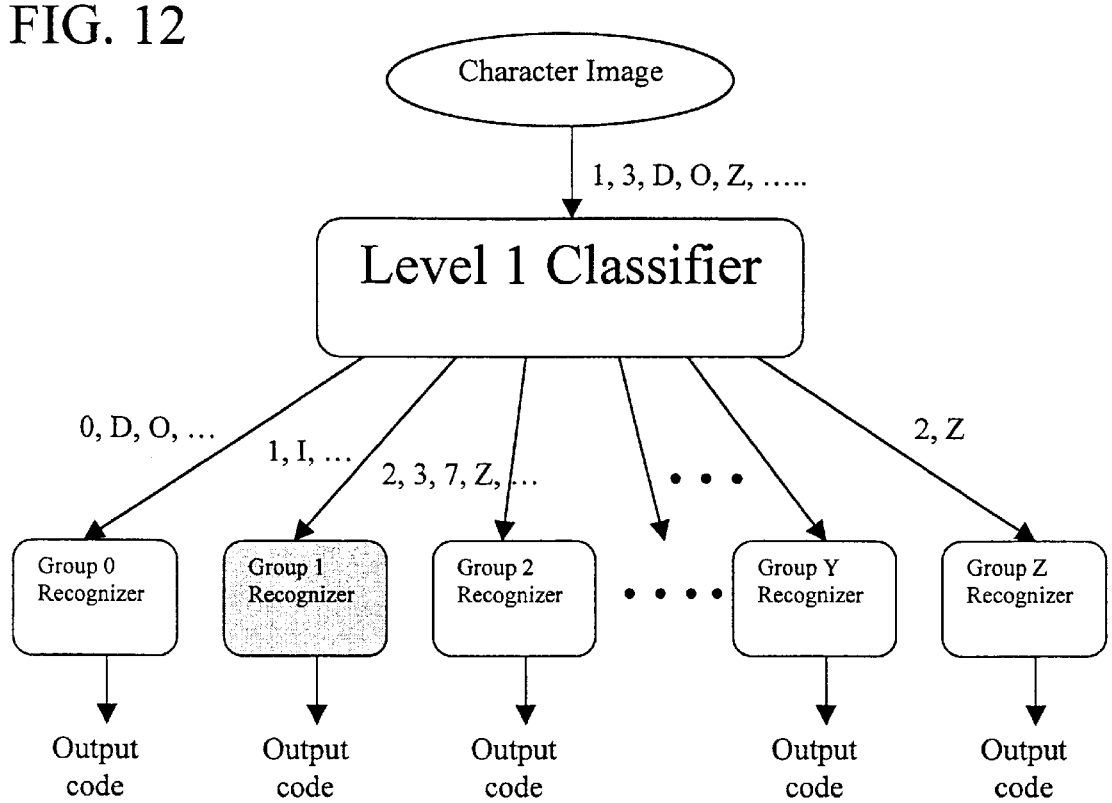
FIG. 12 shows schematically the structure of the character recognition means.

FIG. 12 shows the basic structure of the character recognition means into which the character image is input. In the first layer of the two layer structure there is provided a first level network classifier which classifies all input characters into one of 36 groups labelled Group0 to GroupZ. When a character is classified into GroupZ, say it means that the input character pattern has the characteristics of the letter Z, but it does not necessarily mean that the character is in fact the letter Z. For example, one can imagine that the characters 3,8,9,B and R all have at least some of the characteristics of the numeral 8 and thus will all initially be classified into Group8. Once a character has been assigned into one of the initial 36 groups a group specific recognizer will identify the particular character. Such a character recognizer in the second layer can have a high degree of accuracy since it is only having to identify between a small set of characters.

Figure 13:
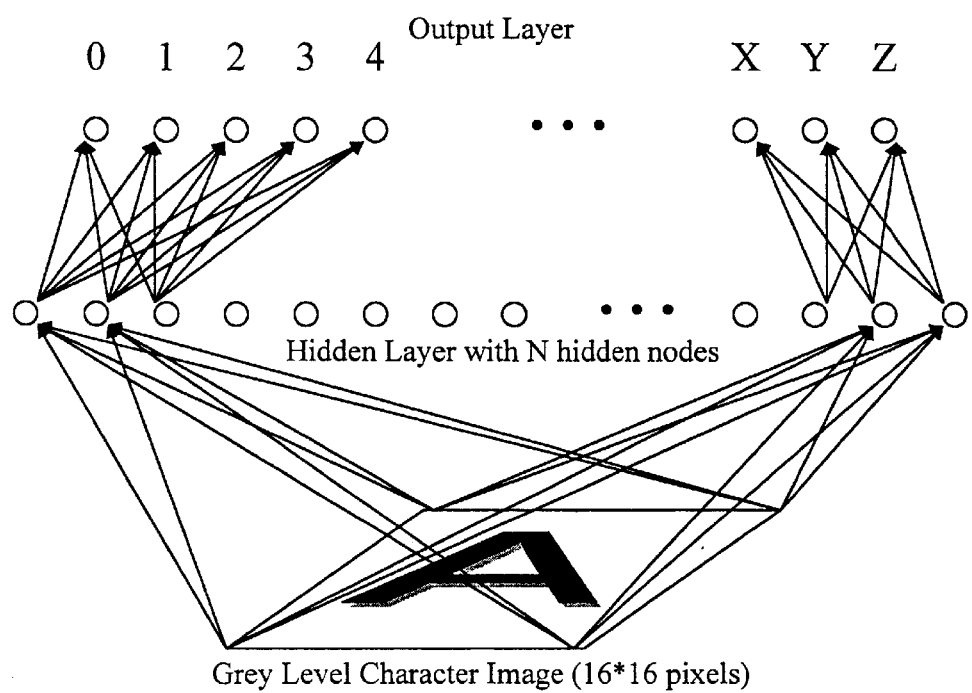
FIG. 13 shows schematically the structure of the first network classifier.

The first level classifier will now be described in more detail and with reference to FIG. 13. The first level classifier is a back propagation neural network with 100 hidden nodes and 36 output nodes trained to an acceptable level by a large training set (eg over 1000 character images extracted from an automatic extraction program). A back propagation network is a feed forward network that employs a back propagation algorithm for training the network in the training phase. This training algorithm starts with an arbitrary set of weights throughout the full connected network. In each training cycle, the output of the nodes in the output layer are compared against their desired outputs to generate their errors, then the errors are propagated back into the hidden layers of the network starting with the errors at the output layer. In the meantime the corresponding weights in the network are adjusted to minimize the errors in the output layer. The function of the first level classifier is to classify each input character image in to one of the 36 groups such that characters will fall into GroupX only if they are a member of GroupX. Member lists of each group were defined as follows. A large group of test cases (over 1000 character images) is selected as the input to the first level classifier and a record is made of which character's image will fall into each group. For example, if an image of character N is mis-recognized as H, then N would be a member of GroupH.

For each group a back projection neural network can be trained to recognize which character within a group a character image represents in a second level. Due to the small size of these groups, this can be done with good performance. If a character set in a given group is still too large, a third level recognizing neural network may be constructed. FIG. 14 illustrates the possible members of 36 groups.

The error level of the first level classifier is dependent on the number of hidden nodes, and experimental results (stepped in multiples of 25) suggest that 100 nodes gives an optimum performance and is therefore the preferred number of hidden nodes.

Each recognizer associated with a given group in the second level also forms part of a back projection neural network, and again 100 hidden nodes is considered to be optimal for achieving a maximum recognition rate.

The two-level structure has a number of advantages over the prior art, notably a shorter training period, flexibility to adapt to deviation of character images, simple design, higher recognition rate and faster recognition.

Small networks can be trained in parallel which leads to a shorter training period. Moreover, each neural network performs a small and specific task and therefore needs fewer cycles in the training process. If a new character image is added to the system, the first level classifier does not need to be changed. If the new image has the characteristic of X, for example, the classifier will classify it into GroupX. At that point GroupX has a new member and only the recognizer for GroupX needs to be trained to identify the new character. Similarly in the event of character deviation, only those recognizers relevant to the deviating characters need to be retrained rather than the whole network.

Although the system of the present invention uses two networks, it is faster than a system using just one network recognizer. The recognition task has been split into two simpler tasks than can each be completed by a smaller network than would have been required if a single network had been used to complete the entire recognition process. Since the number of calculations in a fully connected neural network is proportional to the square of the size of the network, the calculations of two small networks will be faster than the calculations of one larger network.

As described above there is provided a system for character recognition having various general uses. The system is in particular capable of recognizing characters in difficult conditions such as bad weather, varying light, or where the characters have faded, been subject to rust, mud or weathering. In particular the system is well suited to recognizing vehicle number plates or cargo container codes. In the case of vehicle number plates the system may be used in tunnels, highways and car parks to collect vehicle license plate information which may then be used to analyze vehicle flow rates, vehicle types, driving speeds and to detect unauthorized vehicle movements. It may also be used for collection of road or tunnel tolls.

In connection with cargo containers, the system may be used to monitor the movements into and out of container terminals of cargo containers. In this application the character recognition system as described above may be combined with container code extraction and verification steps. For example, container code extraction may be achieved by finding all 4 consecutive alphabetic characters, 6 consecutive numeric characters and 3 consecutive numeric characters from all extracted and recognized characters. From all combinations of the 4 consecutive alphabetic characters and 6 consecutive numeric characters, if the arrangement of the combination match with the normal container code arrangement, this will be regarded as the container code.

Having thus identified the container code it may then be verified with the verification being implemented by finding the longest common subsequence in the target container code and the recognized container code. The Wagner-Fischer dynamic programming method of finding the longest common subsequence is used. Details of this method are discussed in *String Search*: Graham A Stephen, Technical Report TR-92-gas-01, University College of North Wales.

A number of different code extraction and verification methods are possible once the characters have been identified. The following is a description of one possibility.

The container code consists of two parts. The first part is the company code and the second part is the container number. The company code consists of four alpha characters. The last of the four alpha characters is usually the character "U". The company code may look like "APLU", "TEXU", etc. The container number is either a 6-digit number or a 7-digit number. The last digit of the 7-digit is the check digit which is calculated from the whole container code. There is no check digit for 6-digit container number. Only "APLU" container codes are in 6-digit format. The container code thus consists of 10 or 11 characters. The container code can be aligned in one, two or three lines horizontally or one line vertically. The actual character size, spacing and separation of the container code is variable. More than 1000 container images were inspected. It was found that the character spacing within the container code need not be evenly distributed. There are at most three positions in the container code that are of abnormal wide spacing and all the other positions are of regular spacing. At the abnormal wide spacing positions, they are usually separated by some structural bars. The regular character spacing in the range [0. .4], corresponds to average character width or height of the whole horizontal or vertical container code respectively. The abnormal wide spacing and separation specifications are summarized as follows:

Horizontal Container Code Format 1-line
(a) Horizontal Separations

[TEXU]←$S_1$→[123456]←$S_2$→[7]

[TEXU]-Company Code $C_C$, [123456]-Container Number $C_N$

The separation ($S_1$) between $C_C$ and $C_N$ which is within [1 . . . 10] average character width of the whole code, this position being usually blocked by the structural bar.

The separation ($S_2$) at $C_N$ termination is within [1 . . . 4] average character width of the whole code.

(b) Vertical Separations

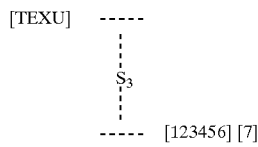

The vertical separation ($S_3$) between the center of the rightmost alpha character and the leftmost numeric character is smaller than the average character height of the whole code.

To ensure the whole code has similar character size, the difference between the average character heights of the two character lines should be one-third of the average character height of the whole code.

2-line:
(a) Horizontal Separation (Allowance for choice of representations)

[TEXU]

[123456]←$S_2$→[7]

Separation ($S_2$) is within [0 . . . 4] of the average character width of the whole code.

[or]

[TEXU]

[123]←$S_1$→[456]←$S_2$→[7]

Separation ($S_1$) is within [1 . . . 6] average character width of the whole code, this position being usually blocked by the structural bar.

Separation ($S_2$) is within [0 . . . 4] average character width of the whole code.

[TEXU]

←$S_4$→[123456] [7]

Horizontal separation ($S_4$) between the start of the two lines is less than five times the average character width of the whole code.

(b) Vertical Separation

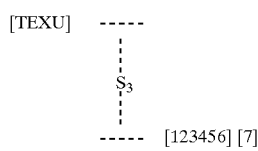

Vertical separation ($S_3$) between the center of the rightmost alpha character and the leftmost numeric character is in the range [1 . . . 3] of the average character height of the whole code.

To ensure the whole code has similar character size, the difference between the average character heights of the two character lines is one-third of the average character height of the whole code.

3-line:

[APLU]

[123]

[456]

Note that only the Company code APLU has a 3-line format and there is essentially no check digit for this code.

Vertical and Horizontal Separations

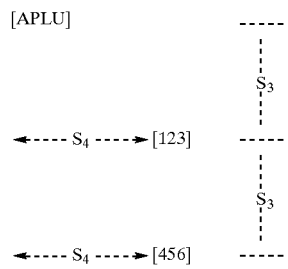

The vertical separation ($S_3$) between the center of the start of the lines is in the range [1 . . . 3] of the average character height of the whole code.

The horizontal separation ($S_4$) between the start of the two lines is less than two times the average character width of the whole code.

To ensure the whole code has similar character size, the difference between the average character heights of the two character lines is one-third the average character height of the whole code.

Vertical Container Code Format

[T]
[E]
[X]
[U]

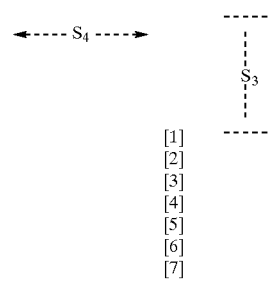

The vertical separation ($S_3$) between the lower most alpha character and the uppermost numeric character is within [1 . . . 8] of the average character height of the entire code.

The horizontal separation ($S_4$) between the lower most alpha character and the uppermost numeric character is less than half the average character width of the entire code.

Once again as before, to ensure the whole code has similar character size, the difference between the average character heights of the two parts is less than half of the average character height of the whole code.

Container Code Extraction

There are some specific rules to extract the container code from all the extracted and recognized characters. From the previous line grouping of the characters, two groups $G_v$ and $G_h$ are produced which are the sets of all horizontal character lines and all vertical character lines respectively. $H_i$ is a line of characters in the set $G_h$. $h_{i,j}$ is a character in the line $H_i$. The character $h_{i,j}$ in the line $H_i$ is ordered by their position in the image from left to right, ie $h_{i,j}$ is in the left of $h_{i,j+1}$. $H_i$ in $G_h$ is ordered from top to bottom, ie $H_i$ is at the top of $H_{i+1}$. $V_i$ is a line of characters in the set $G_v$, $V_{i,j}$ for all i,j are the characters in the line $V_i$. The character $v_{i,j}$ in the line $V_i$ is ordered by the position in the image from left to right, ie $v_{i,j}$ is in the left of $v_{i,j+1}$. $V_i$ in $G_v$ is ordered from top to bottom. ie $V_i$ is at the top of $V_{i+1}$.

Development of the Algorithms

The container code at the rear of the container is usually aligned horizontally while the container code in the front is usually aligned vertically. The following algorithms are used to extract the horizontal or vertical container codes.

If the camera is placed at the rear of the container,

Step 1: Apply horizontal container code extraction to get the company code and the container number.

Step 2: If the recognized check digit in the horizontal container code equals to the calculated one or the recognized company code is "APLU" that is followed by six numeric characters, then the recognized horizontal container code is the result, otherwise apply vertical container code extraction.

Step 3: If the recognized check digit in vertical container code extraction equals to the calculated one or the recognized company code of this vertical container code is "APLU" that is followed by six numeric characters or there is no horizontal container code found in step 2, this vertical container code is the result, otherwise the horizontal container code is the result.

If the camera is placed in the front of the container,

Step 1: Apply vertical container code extraction to get the company code and the container number.

Step 2: If the recognized check digit in the vertical container code equals to the calculated one or the recognized company code is "APLU" that is followed by six numeric characters, then the recognized vertical container code is the result, otherwise apply horizontal container code extraction.

Step 3: If the recognized check digit in horizontal container code extraction equals to the calculated one or the recognized company code of this horizontal container code is "APLU" that is followed by six numeric characters or there is no vertical container code found in step 2, this horizontal container code is the result, otherwise the vertical container code is the result.

Horizontal Container Code Extraction

The detailed procedure for Horizontal Container code extraction can be divided into the following stages:

1. Find the groups of characters that consist of 4 consecutive alpha characters aligned horizontally. These groups are said to be 4-alpha strings. The characters in the actual container code may not be 100% segmented and recognized. We need a robust algorithm to locate the 4 consecutive alpha-characters which are aligned horizontally and linearly. A score is assigned to each characters based on the "Alpha-Score" Table given below.

Alpha-Score Table

| char = | 0 | 1 | 2 | 3 | 4 | 5 | 6 | 7 | 8 | 9 | A | B | C | D | E | F | G | H |
|---|---|---|---|---|---|---|---|---|---|---|---|---|---|---|---|---|---|---|
| Alpha (char) = | 10 | 5 | 0 | 5 | 0 | 0 | 0 | 0 | 0 | 0 | 10 | 10 | 10 | 10 | 10 | 10 | 10 | 10 |
| char = | I | J | K | L | M | N | O | P | Q | R | S | T | U | V | W | X | Y | Z |
| Alpha (char) = | 10 | 10 | 10 | 10 | 10 | 10 | 10 | 10 | 10 | 10 | 10 | 10 | 10 | 10 | 10 | 10 | 10 | 10 |

The numeric characters 1,3 are said to be partial alpha characters. Some alpha characters will easily be misrecognized as these partial alpha characters. The numeric character "0" is indistinguishable from alpha character "0". The following rules are used:

$$Alpha_{sum4}(h_{i,j}) = \sum_{n=0}^{3} Alpha(h_{i,j-n}) \quad \text{if } (h_{i,j} \in H_i) \text{ and } (H_i \in G_h)$$

given the constraint that $Alpha(h_{i,j-n}) = 0$ if $h_{i,j-n}|_{n=1,2,3} \notin H_i$ $$Alpha_{loc4}(k) = (i, j) \quad \text{if } Alpha_{sum4}(h_{i,j}) \geq 25, k = 1, 2, \ldots$$

$Alpha_{sum4}$ represents the concatenated string of four consecutive alpha characters and $Alpha_{loc4}$ is the location of $Alpha_{sum4}$. If there is overlapping of $Alpha_{sum4}$, the leftmost one is chosen. At the left of $Alpha_{loc4}$, there should be at least 2 alpha characters and 1 partial alpha character or at least 1 alpha character and 3 partial alpha characters.

2. Find the groups of characters that are groups of 6 consecutive numeric characters aligned horizontally. These groups are said to be 6-numeric strings. A score is assigned to each characters based on the "Numeric-Score" Table.

Numeric-Score Table

| char = | 0 | 1 | 2 | 3 | 4 | 5 | 6 | 7 | 8 | 9 | A | B | C | D | E | F | G | H |
|---|---|---|---|---|---|---|---|---|---|---|---|---|---|---|---|---|---|---|
| Num (char) = | 10 | 10 | 10 | 10 | 10 | 10 | 10 | 10 | 10 | 10 | 5 | 9 | 5 | 5 | 0 | 0 | 5 | 0 |
| char = | I | J | K | L | M | N | O | P | Q | R | S | T | U | V | W | X | Y | Z |
| Num (char) = | 10 | 0 | 0 | 0 | 0 | 0 | 10 | 0 | 0 | 0 | 0 | 5 | 0 | 0 | 5 | 0 | 0 | 0 |

The alpha characters A, B, C, D, G, T, W are said to be partial numeric character. Some numeric characters will easily be misrecognized as these partial numeric characters. The alpha characters "O", "I" is indistinguishable from numeric character "O", "1" respectively. The following rules are used:

$$Num_{sum6}(h_{i,j}) = \sum_{n=0}^{5} Num(h_{i,j-n}) \quad \text{if } (h_{i,j} \in H_i) \text{ and } (H_i \in G_h)$$

given the constraint that $Num(h_{i,j-n}) = 0$ if $h_{i,j-n}|_{n=1,2,3,4,5} \notin H_i$ $$Num_{loc6}(k) = (i, j) \quad \text{if } Num_{sum6}(h_{i,j}) \geq 45, k = 1, 2, \ldots$$

The summation symbol is used to denote concatenation of strings.

$Num_{sum6}$ represents the concatenated string of six consecutive numeric characters and $Num_{loc6}$ is the location of $Num_{sum6}$. If there is overlapping of any of the characters of $Num_{sum6}$, the leftmost one is chosen. At the left of $Num_{loc6}$, there should be at least 4 numeric characters and 1 partial numeric character or at least 3 numeric characters and 3 partial numeric characters.

3. Find the groups of characters that are groups of 3 consecutive numeric characters aligned horizontally.

These groups are said to 3-numeric strings. The Alpha_Score table is the same as the above. The following rule are used:

$$Num_{sum3}(h_{i,j}) = \sum_{n=0}^{2} Num(h_{i,j-n}) \quad \text{if } (h_{i,j} \in H_i) \text{ and } (H_i \in G_h)$$

given the constraint that $Num(h_{i,j-n}) = 0$ if $h_{i,j-n}|_{n=1,2} \notin H_i$ $$Num_{loc3}(k) = (i, j) \quad \text{if } Num_{sum3}(h_{i,j}) \geq 22, k = 1, 2, \ldots$$

$Num_{sum3}$ represents the concatenated string of three consecutive numeric characters and $Num_{loc3}$ is the location of $Num_{sum3}$. If there is overlapping of any of the characters of $Num_{sum3}$, the leftmost one is chosen. At the left of $Num_{loc3}$, there should be at least 2 numeric characters and 1 partial numeric character.

4. Match all $alpha_{sum4}$ strings with all $numeric_{sum6}$ strings and $numeric_{sum3}$ strings. Two or three strings will be concatenated together if they satisfy the 1-line, 2-line or 3-line horizontal container code format defined in the previous section. There may be more than one match that satisfies the container code specifications. They will be chosen based on the following criteria:

i. The container code is more likely to be at the top of the image.

ii. 1-line is more often seen than 2-line. And 2-line is more often seen than 3-line.

iii. The character size of the container code is larger than the other characters in the image.

The detailed algorithm based on the above criteria can be formulated in the following steps:

a. Concatenate the $alpha_{sum4}$ strings with the $numeric_{sum6}$ strings and two $numeric_{sum3}$ strings based on the 1-line format, then 2-line format, and then 3-line horizontal container code format, for all possibilities from the top to the bottom of the image.

b. During searching, keep track of the best code found given the assumption that only one container code is in the image.

c. During 1-line and 2-line container code search, the code found subsequently will be chosen to be the best if the average character height of the code found subsequently is more than 1.2 times the average character height of the best. The height is used instead of the width because the height of the characters is more similar than the width. The variation of the width of the characters such as I, 1, W and M is very large.

d. During 3-line container code search, the code found subsequently will be chosen to be the best if the average character height of the code found subsequently is more than 1.4 times the average character height of the best. Since there are more false cases found during 3-line container code search, the threshold is increased to select the larger container code from 1.2 to 1.4.

e. If a container code is found from the above search and it is in 1-line or 2-line format, the next character on the right of the $numeric_{sum6}$ one will be chosen as the check digit if it exists and is a numeric character. The $numeric_{sum6}$ string will become a $numeric_{sum7}$ string.

5. Based on the above algorithm, the characters in the $alpha_{sum4}$ part may not be all alpha characters and the characters in the $numeric_{sum6}$ or $numeric_{sum7}$ part may not be all numeric characters. Thus, the $alpha_{sum4}$ part will be converted to alpha character by the "Any-to-Alpha" table and the $numeric_{sum6}$ or $numeric_{sum7}$ part will be converted to numeric characters by the "Any-to-Numeric" table. These two tables are built by investigating all the error cases of the recognition module. These tables will be converted by the following rule.

Any-to-Numeric Table

| 0 | 1 | 2 | 3 | 4 | 5 | 6 | 7 | 8 | 9 | A | B |
|---|---|---|---|---|---|---|---|---|---|---|---|
| 0 | 1 | 2 | 3 | 4 | 5 | 6 | 7 | 8 | 9 | 4 | 8 |
| C | D | E | F | G | H | I | J | K | L | M | N |
| 2 | 0 | 8 | 1 | 6 | 8 | 1 | 3 | 4 | 0 | 1 | 4 |
| O | P | Q | R | S | T | U | V | W | X | Y | Z |
| 0 | 1 | 0 | 8 | 5 | 1 | 0 | 1 | 1 | 4 | 7 | 2 |

Any-to-Alpha Table

| 0 | 1 | 2 | 3 | 4 | 5 | 6 | 7 | 8 | 9 | A | B |
|---|---|---|---|---|---|---|---|---|---|---|---|
| O | I | Z | J | A | S | G | T | B | O | A | B |
| C | D | E | F | G | H | I | J | K | L | M | N |
| C | D | E | F | G | H | I | J | K | L | M | N |
| O | P | Q | R | S | T | U | V | W | X | Y | Z |
| O | P | Q | R | S | T | U | V | W | X | Y | Z |

Vertical Container Code Extraction

1. Find the groups of characters that are groups of 4 consecutive alpha characters aligned vertically. These groups are said to be 4-alpha strings. A score is assigned to each characters based on the "Alpha-Score" Table which is defined previously. The following rules are used:

$$Alpha_{sum4}(v_{i,j}) = \sum_{n=0}^{3} Alpha(v_{i,j-n}) \quad \text{if } (v_{i,j} \in V_i) \text{ and } (V_i \in G_v)$$

given the constraint that $Alpha(v_{i,j-n}) = 0$ if $v_{i,j-n}|_{n=1,2,3} \notin V_i$ -continued $$Alpha_{loc4}(k) = (i, j) \quad \text{if } Alpha_{sum4}(v_{i,j}) \geq 25, k = 1, 2, \ldots$$

The summation operation denotes the process of concatenation of strings.

$Alpha_{sum4}$ represents the concatenated string of four consecutive alpha characters and $Alpha_{loc4}$ is the location of $Alpha_{sum4}$. If there is overlapping of $Alpha_{sum4}$, the topmost one is chosen. At the top of $Alpha_{loc4}$, there should be at least 2 alpha characters and 1 partial alpha character or at least 1 alpha character and 3 partial alpha characters.

2. Find the groups of characters that are groups of 6 consecutive numeric characters aligned vertically.

These groups are said to be 6-numeric strings. A score is assigned to each characters based on the "Numeric-Score" Table which is defined previously. The following rules are used:

$$Num_{sum6}(h_{i,j}) = \sum_{n=0}^{5} Num(h_{i,j-n}) \quad \text{if } (v_{i,j} \in V_i) \text{ and } (V_i \in G_v)$$

given the constraint that $Num(v_{i,j-n}) = 0$ if $v_{i,j-n}|_{n=1,2,3,4,5} \notin V_i$ $$Num_{loc6}(k) = (i, j) \quad \text{if } Num_{sum6}(v_{i,j}) \geq 45, k = 1, 2, \ldots$$

The summation symbol is used to denote concatenation of strings.

$Num_{sum6}$ represents the concatenated string of six consecutive numeric characters and $Num_{loc6}$ is the location of $Num_{sum6}$. If there is overlapping of any of the characters of $Num_{sum6}$, the topmost one is chosen. At the top of $Num_{loc6}$, there should be at least 4 numeric characters and 1 partial numeric character or at least 3 numeric characters and 3 partial numeric characters.

3. To match all 4-alpha strings with all 6-numeric strings. Two strings will be concatenated together if they satisfy the 1-line vertical container code format defined in the previous section. There may be more than one match that satisfies the container code specifications. They will be chosen based on the following criteria:
   i. The container code is more likely to be at the top of the image.
   ii. The character size of the container code is larger than the other characters in the image.

The detailed algorithm based on the above criteria is as follows:
   a. Concatenate the $alpha_{sum4}$ strings with the $numeric_{sum6}$ strings based on the 1-line vertical container code format, trying out all the possibilities from the top to the bottom of the image.
   b. During searching, keep track of the best code found, given the assumption that only one container code is in the image.
   c. During 1-line vertical container code search, the code found subsequently will be chosen to be the best if the average character height of the code found subsequently is more than 1.2 times the average character height of the best. The height is used instead of the width because the height of the character is more similar than the width. The variation of the width of the characters I, 1, W and M is very large.
   d. If a container code was found from the above search, the next character at the bottom of the $numeric_{sum6}$ will be chosen as the check digit if it exists and is a numeric character. The $numeric_{sum6}$ string will become a $numeric_{sum7}$ string.

4. Based on the above algorithm, the characters in the $alpha_{sum4}$ part may not be all alpha characters and the characters in the $numeric_{sum6}$ or $numeric_{sum7}$ part may not be all numeric characters. Thus, the $alpha_{sum4}$ part will be converted to alpha character by the "Any-to-Alpha" table and the $numeric_{sum6}$ or $numeric_{sum7}$ part will be converted to numeric characters by the "Any-to-Numeric" table. These two tables are defined previously.

We claim:

1. A method of identifying a sequence of alphanumeric characters, comprising the steps of:
   (a) producing a grey level image of said character sequence,
   (b) locating potential characters from said grey level image including filtering said image with a long horizontal and long vertical line segments removal filter,
   (c) normalizing the size and contrast of said extracted potential characters as grey level character images, and
   (d) inputting said normalized potential characters as grey level character images to a character recognition means, wherein said character recognition means comprises two network classifiers, a first one of said network classifiers comprising a first hidden layer feed forward neural network which classifies the input pattern into a first set of categories, and the second one of said network classifiers comprising a second hidden layer feed forward neural network which recognizes the pattern from the first set of pattern categories.

2. A method of identifying characters as claimed in claim 1 wherein after filtering said image, successive horizontal and vertical segmentation techniques are used to segment the regions potentially containing characters.

3. A method of identifying characters as claimed in claim 2 wherein said segmentation techniques include removing unlikely potential characters.

4. A method of identifying characters as claimed in claim 2 wherein after segmentation the segmented regions are binarized and connected components are found by a four-way recursive component search.

5. A method of identifying characters as claimed in claim 2 including searching for lines of potential characters of similar heights and widths.

6. A method of identifying characters as claimed in claim 2 wherein said horizontal and vertical segmentation techniques include locating a local minimum in a horizontal or vertical projection followed by a vertical or horizontal local minimum, respectively, of the segmented regions to provide the horizontal and vertical segmentation points.

7. A method of identifying characters as claimed in claim 1 wherein characters are normalized to a size of 16×16 pixels.

8. A method of identifying characters as claimed in claim 1 wherein after normalization the foreground and background colors are determined.

9. A method of identifying characters as claimed in claim 1 wherein said first network classifier comprises 100 hidden nodes and 36 output nodes.

10. A method of identifying characters as claimed in claim 1 wherein said second network classifier comprises 100 hidden nodes.

* * * * *

UNITED STATES PATENT AND TRADEMARK OFFICE
CERTIFICATE OF CORRECTION

PATENT NO.    : 6,026,177
DATED         : February 15, 2000
INVENTOR(S)   : John Chung Mong LEE et al.

It is certified that error appears in the above-identified patent and that said Letters Patent is hereby corrected as shown below:

<u>Title page,</u>
Item [19], the identification of the inventive entity is changed from "Mong et al" to -- Lee et al --.

Item [75], 1ˢᵗ inventor name should read -- John Chung Mong Lee --

Signed and Sealed this

Seventh Day of January, 2003

JAMES E. ROGAN
*Director of the United States Patent and Trademark Office*